United States Patent
Tojo

(10) Patent No.: US 7,170,935 B2
(45) Date of Patent: *Jan. 30, 2007

(54) IMAGE PROCESSING APPARATUS AND METHOD, AND COMPUTER-READABLE MEMORY

(75) Inventor: Hiroshi Tojo, Fuchu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/503,476

(22) Filed: Feb. 14, 2000

(65) Prior Publication Data
US 2003/0086021 A1 May 8, 2003

(30) Foreign Application Priority Data
Feb. 15, 1999 (JP) ............................. 11-036512

(51) Int. Cl.
*H04B 1/66* (2006.01)

(52) U.S. Cl. ................................. 375/240.01
(58) Field of Classification Search ........... 375/240.01, 375/240.02, 240.09, 240.08, 240.11, 240.12, 375/240.13, 240.15, 240.16, 240.17; 348/699, 348/700, 416.1, 415.1; 382/232, 236, 240, 382/115; 386/46, 69, 305; *H04B 1/66*
See application file for complete search history.

(56) References Cited

U.S. PATENT DOCUMENTS

| | | | | | |
|---|---|---|---|---|---|
| 5,412,738 | A | * | 5/1995 | Brunelli et al. | 382/115 |
| 5,493,345 | A | * | 2/1996 | Ishikawa et al. | 348/700 |
| 6,021,231 | A | * | 2/2000 | Miyatake et al. | 382/305 |
| 6,038,258 | A | * | 3/2000 | Chun et al. | 375/240 |
| 6,064,436 | A | * | 5/2000 | Okada | 348/416.1 |
| 6,195,497 | B1 | * | 2/2001 | Nagasaka et al. | 386/46 |
| 6,323,877 | B1 | * | 11/2001 | Katoh et al. | 345/638 |
| 6,400,890 | B1 | * | 6/2002 | Nagasaka et al. | 386/69 |
| 6,424,744 | B2 | * | 7/2002 | Miyatake et al. | 382/190 |
| 6,608,964 | B1 | * | 8/2003 | Saito | 386/52 |
| 2001/0003468 | A1 | * | 6/2001 | Hampapur et al. | 348/700 |
| 2002/0012521 | A1 | * | 1/2002 | Nagasaki et al. | 386/46 |

* cited by examiner

*Primary Examiner*—Tung Vo
(74) *Attorney, Agent, or Firm*—Fitzpatrick, Cella, Harper & Scinto

(57) ABSTRACT

Frames constituting an input moving picture are extracted by a frame extraction unit, the extracted frames are compared and scene changes in the moving picture are discriminated by a scene-change discrimination unit. Scene-change information relating to specific scene changes is stored in a scene-change information storage unit. An image corresponding to a scene that is the object of a search is designated from a pattern-image designation unit. The designated image is compared with scene-change frames obtained by referring to the scene-change information that has been stored in the scene-change storage unit, and a scene corresponding to the image is extracted by a scene extraction unit based upon results of the comparison.

14 Claims, 7 Drawing Sheets

FIG. 5

| ID OF MOVING PICTURE | ID OF SCENE CHANGE | STARTING FRAME | INTENSITY OF SCENE CHANGE |
|---|---|---|---|
| 0 | 0 | 0 | 90 |
| 0 | 1 | 10 | 50 |
| 0 | 2 | 16 | 80 |

FIG. 7

| ID OF MOVING PICTURE | STARTING FRAME | END FRAME |
|---|---|---|
| 0 | 10 | 15 |
| 0 | 20 | 34 |
| 1 | 15 | 38 |

IMAGE PROCESSING APPARATUS AND METHOD, AND COMPUTER-READABLE MEMORY

FIELD OF THE INVENTION

This invention relates to an image processing apparatus and method for processing a moving picture, and to a computer-readable memory storing the program code for this processing.

BACKGROUND OF THE INVENTION

When only a specific scene (a part of a TV program that begins from a specific title screen of the program, or a scene in which a specific person appears) is to be extracted from a plurality of moving-picture materials gathered by a video camera or VTR, etc., the user searches for the desired scene by repeatedly fast-forwarding or playing back each moving-picture material, writes down the time code of each scene and creates a list of time codes. Then, on the basis of the created list of time codes, the user performs an editing operation such as gathering specific scenes together and combining them into one moving picture.

However, in order to extract a specific scene from a plurality of moving-picture materials, the operator must perform the manual operations of fast-forward and playback, search for the desired scene and create the list of time codes. This requires a great deal of time and labor.

SUMMARY OF THE INVENTION

Accordingly, an object of the present invention is to provide an image processing apparatus, method and computer-readable memory which make it possible to extract a desired scene from a plurality of moving-picture materials in an efficient manner.

According to the present invention, the foregoing object is attained by providing an image processing apparatus for processing a moving picture, comprising:
frame extraction means for extracting frames constituting an entered moving picture; discrimination means for discriminating a scene change by comparing frames extracted by the frame extraction means; storage means for storing scene-change information relating to the scene change discriminated by the discrimination means; designating means for designating an image that corresponds to a scene that is the object of a search; comparison means for comparing a scene-change frame, which is obtained by referring to the scene-change information that has been stored in the storage means, and the image that has been designated by the designation means; and scene extraction means for extracting a scene that corresponds to the image based upon result of the comparison performed by the comparison means.

The foregoing object is attained by providing an image processing method for processing a moving picture, comprising: a frame extraction step of extracting frames constituting an entered moving picture; a discrimination step of discriminating a scene change by comparing frames extracted at the frame extraction step; a storage step of storing scene-change information relating to the scene change discriminated at the discrimination step; a designating step of designating an image that corresponds to a scene that is the object of a search; a comparison step of comparing a scene-change frame, which is obtained by referring to the scene-change information that has been stored at the storage step, and the image that has been designated at the designation step; and a scene extraction step of extracting a scene that corresponds to the image based upon result of the comparison performed at the comparison step.

The foregoing object is attained by providing a computer-readable memory storing program code of image processing for processing a moving picture, the memory including: program code of a frame extraction step of extracting frames constituting an entered moving picture; program code of a discrimination step of discriminating a scene change by comparing frames extracted at the frame extraction step; program code of a storage step of storing scene-change information relating to the scene change discriminated at the discrimination step; program code of a designating step of designating an image that corresponds to a scene that is the object of a search; program code of a comparison step of comparing a scene-change frame, which is obtained by referring to the scene-change information that has been stored at the storage step, and the image that has been designated at the designation step; and program code of a scene extraction step of extracting a scene that corresponds to the image based upon result of the comparison performed at the comparison step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is diagram illustrating an example of scene-change information according to an embodiment of the present invention;

FIG. 7 is a diagram showing an example of a list of extracted scenes according to an embodiment of the present invention.

DESCRIPTION OF THE PREFERRED EMBODIMENT

A preferred embodiment of the present invention will now be described in derail with reference to the accompanying drawings.

Figure 1:
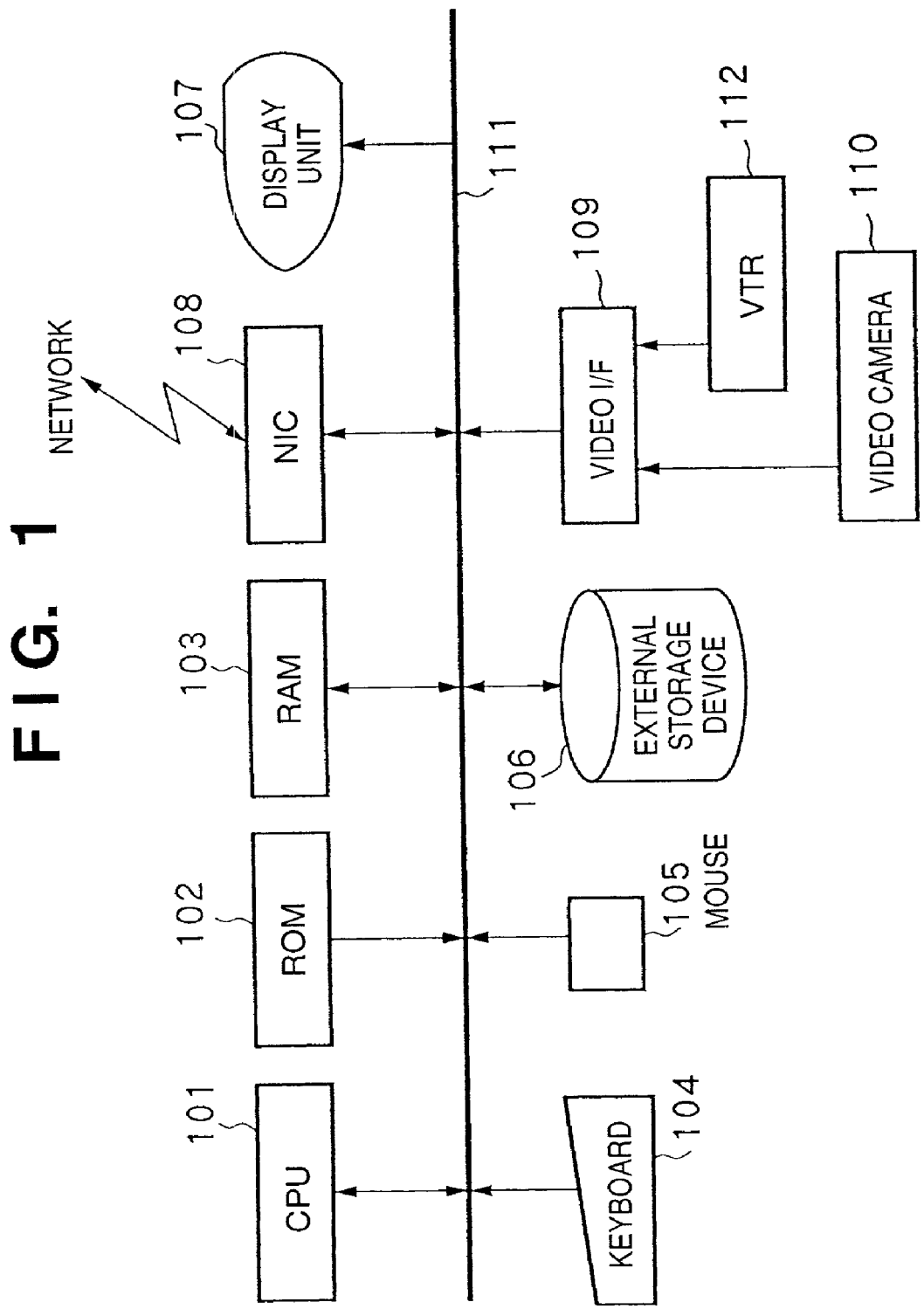
FIG. 1 is a block diagram illustrating the construction of an image processing apparatus according to an embodiment of the present invention.

FIG. 1 is a block diagram illustrating the construction of an image processing apparatus according to a preferred embodiment of the present invention.

As shown in FIG. 1, the apparatus includes a CPU 101 for implementing various control operations regarding various components of the image processing apparatus; a ROM 102 for storing a booting program, which is run when the image processing apparatus is started up, and various data; a RAM 103 which stores a control program run by the CU 101 and which provides a working area when various control operations are executed; a keyboard 104 and a mouse 105 for providing an environment that allows a user to make various inputs; an external storage device 106 constituted by a hard disk, floppy disk or CD-ROM; a display unit 107 constituted by a CRT or LCD or the like which displays the results of processing for the user; a network interface controller (NIC) 108 for making possible communication with various devices on a network; a video interface (I/F) 109 that makes it possible to capture a moving picture from a video camera 110 or VTR 112; and a bus 111 for interconnecting the above-mentioned components.

It should be noted that the video camera 110, VTR 112 and external storage device 106 may be replaced by components connected to the network.

Figure 2:
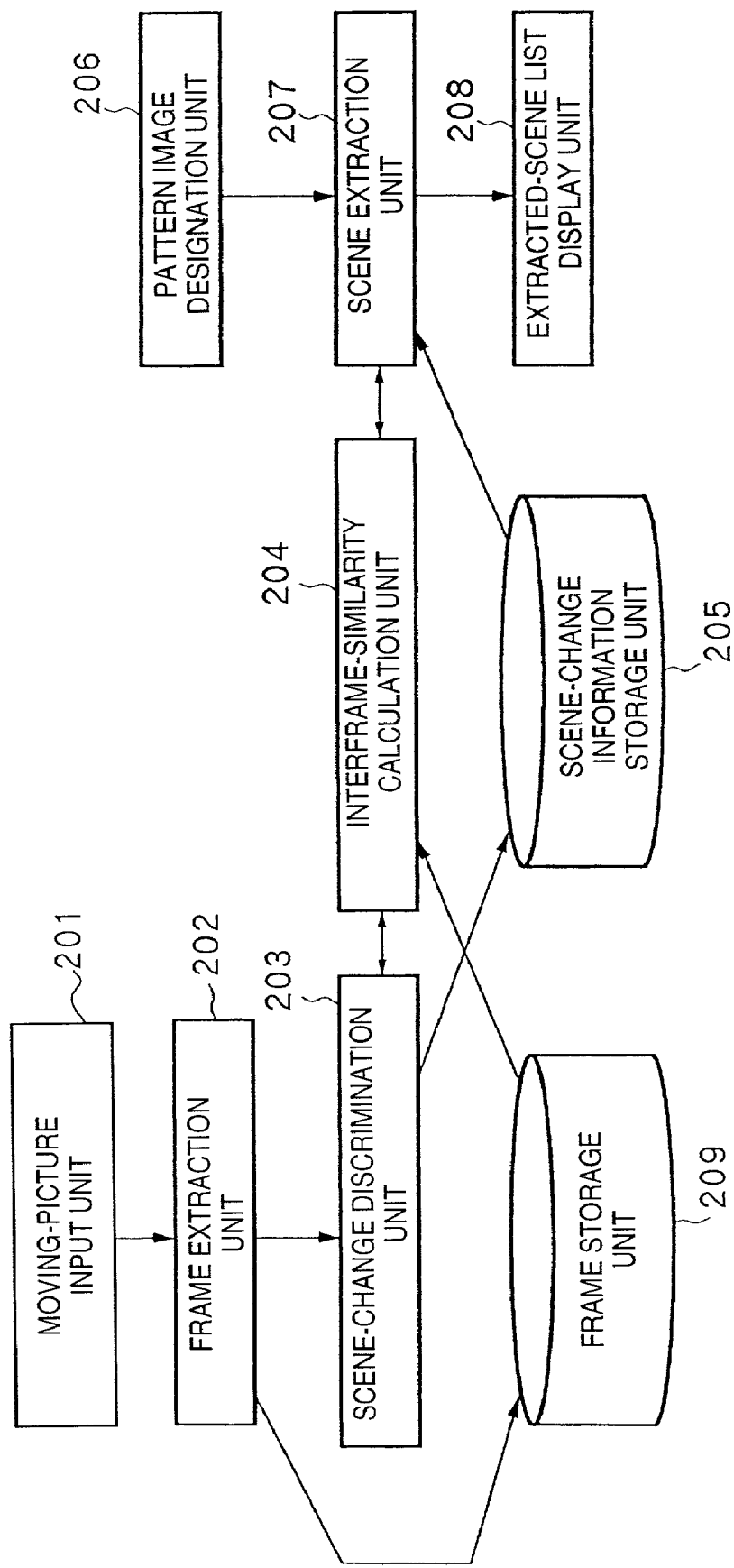
FIG. 2 is a block diagram illustrating the functional construction of an image processing apparatus according to an embodiment of the present invention.

The functions of the image processing apparatus according to this embodiment will be described with reference to FIG. 2.

A moving-picture input unit 201 is for inputting a moving picture captured from the video camera 110 or VTR 112 via the video interface 109 or a moving picture downloaded from the network via the NIC 108. A frame extraction unit 202 successively extracts frames (images), which constitute the entered moving picture, in regular order. A frame storage unit 209 stores frames extracted by the frame extraction unit 202. A scene-change discrimination unit 203 examines each frame to discriminate a scene change in a moving picture using an interframe-similarity calculation unit 204. The latter calculates the degree of similarity between frames. A scene-change information storage unit 205 stores information relating to a scene changes that has been discriminated by the scene-change discrimination unit 203. A pattern image designation unit 206 allows the user to designate a pattern image using the keyboard 104 and mouse 105. A scene extraction unit 207 uses the interframe-similarity calculation unit 204 to compare the pattern image that has been designated by the pattern image designation unit 206 with a frame, in which a scene change has occurred, obtained by referring to the scene-change information storage unit 205, and extracts a desired scene corresponding to the pattern image. An extracted-scene list display unit 208 causes the display unit 107 to display a list of information relating to scenes extracted by the scene extraction unit 207.

An example of operation of the image processing apparatus having the scene extraction function of this embodiment arranged as set forth above will now be described.

[Scene-change Detection Processing]

Processing for detecting a change in scene will be described with reference to FIG. 3.

Figure 3:
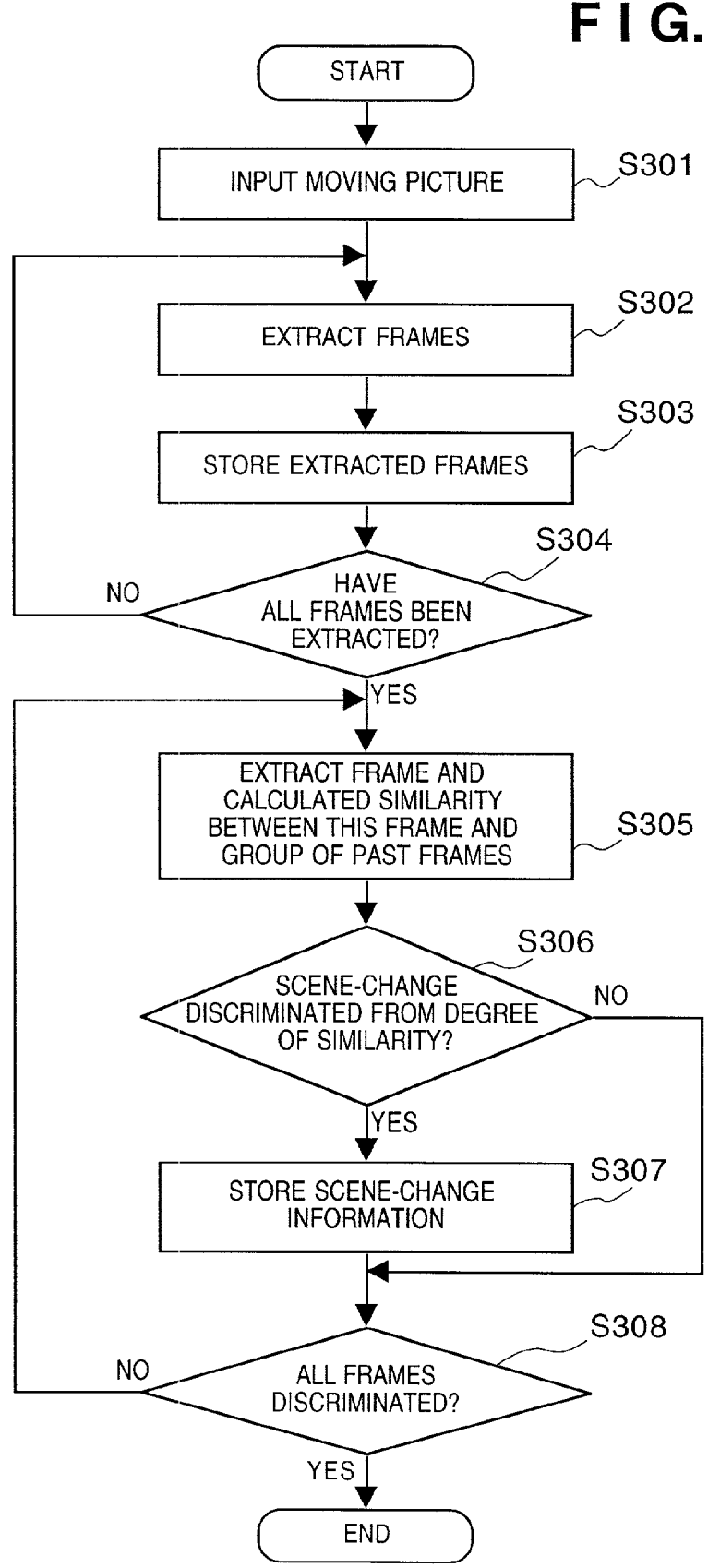
FIG. 3 is a flowchart illustrating the procedure of scene-change detection processing according to an embodiment of the present invention.

FIG. 3 is a flowchart illustrating the procedure of scene-change detection processing according to this embodiment of the present invention.

First, a moving picture to undergo processing is input by the moving-picture input unit 201 at step S301. Next, at step S302, the frame extraction unit 202 executes processing for extracting one frame at a time from the entered moving picture. Then, at step S303, the frame extraction unit 202 stores the extracted frames in the frame storage unit 209.

It is determined at step S304 whether all frames of the entered moving picture have been extracted. If all frames have not been extracted ("NO" at step S304), steps S302 and S303 are repeated. If all frames have been extracted ("YES" at step S304), then control proceeds to step S305.

Step S305 calls for the scene-change discrimination unit 203 to use the interframe-similarity calculation unit 204 to perform, in numerical order, an interframe-similarity calculation between a frame of interest and a group of past frames. There are instances where the group of past frames is a single frame or a plurality of frames, and there is no particular limitation upon the algorithm.

Figure 4:
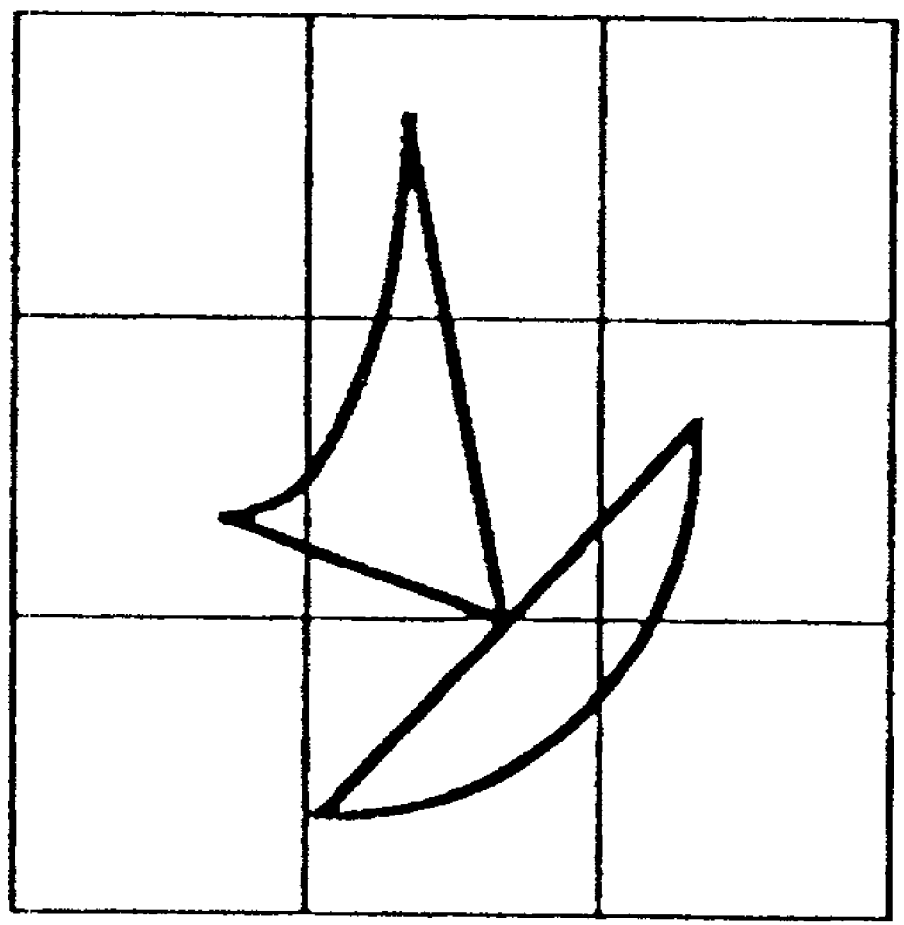
FIG. 4 is diagram illustrating an example of block division of a frame according to an embodiment of the present invention.

The simplest example will now be described. First, the immediately preceding frame and the current frame are each divided into a plurality of blocks vertically and horizontally, as shown in FIG. 4. Next, average values of R, G and B are calculated in regard to each block. This is followed by obtaining the sum of the squares of the differences between the corresponding R, G and B channels in the preceding and current frames. This sum of the squares is taken as interframe similarity, which represents the degree of intensity of the scene change. The smaller the value of the sum of the squares, the greater the similarity between frames; the larger the value, the smaller the similarity. In other words, this is a method of obtaining an instance in which the possibility of a scene change is high. A example of the calculation formula is as follows:

$$\sum_{i=1}^{k}[(P1_{iR}-P2_{iR})^2+(P1_{iG}-P2_{iG})^2+(P1_{iB}-P2_{iB})^2]$$

where i represents the block undergoing processing, and

K: number of blocks into which the frame is divided;

$P1_{iR}$: average value of R channel of ith block of preceding frame;

$P1_{iG}$: average value of G channel of ith block of preceding frame;

$P1_{iB}$: average value of B channel of ith block of preceding frame;

$P2_{iR}$: average value of R channel of ith block of current frame;

$P2_{iG}$: average value of G channel of ith block of current frame;

$P2_{iB}$: average value of B channel of ith block of current frame

On the basis of the result of calculation of interframe similarity, the scene-change discrimination unit 203 determines whether or not there has been a scene change. If there has not been a scene change ("NO" at step S306), control proceeds to step S308. If there has been a scene change ("YES" at step S306), on the other hand, then, at step S307, the ID of the entered moving picture, the ID of the scene change and the frame are stored as the scene starting frame and the similarity (or distance) representing the degree of intensity of the scene change is stored. These items of information shall be referred to as "scene-change information". An example of scene-change information is illustrated in FIG. 5. This information is stored in the scene-change information storage unit 205.

Next, at step S308, it is determined whether all frames of the moving picture have been discriminated for scene change. If all frames have not undergone scene-change discrimination ("NO" at step S308), processing from step S305 to step S307 is repeated until all scene-change frames of the moving picture and the similarity information are obtained. If all frames have undergone scene-change discrimination ("YES" at step S308), on the other hand, then processing is exited.

The foregoing is processing for detecting scene changes and is applied to all moving pictures that are to undergo scene extraction.

[Scene Extraction Processing]

Figure 6:
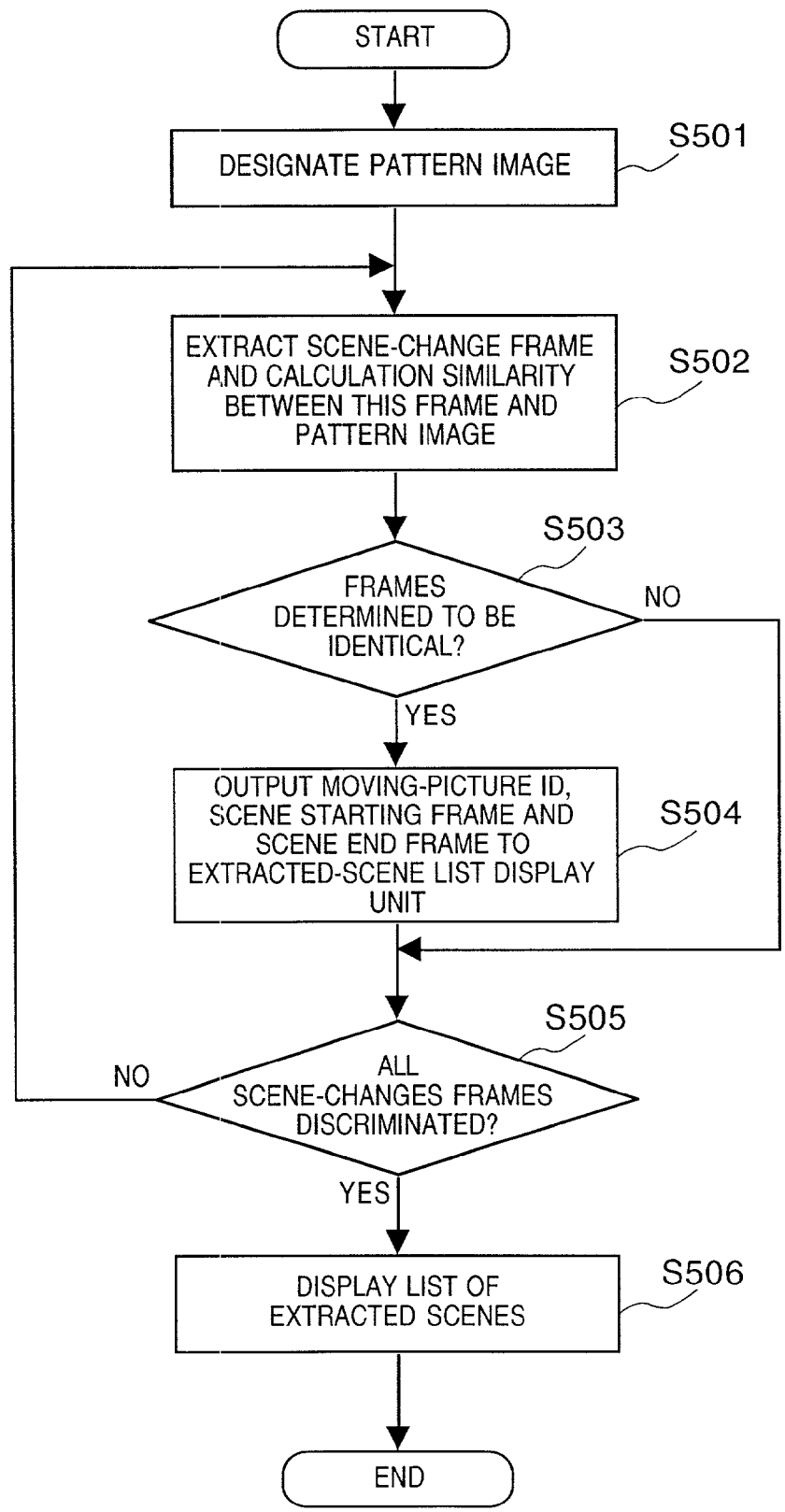
FIG. 6 is a flowchart illustrating the procedure of scene extraction processing according to an embodiment of the present invention.

Reference will be had to FIG. 6 to describe processing for designating a pattern image and extracting a desired scene.

FIG. 6 is a flowchart illustrating the procedure of scene extraction processing according to this embodiment of the present invention.

The user designates a pattern image using the pattern image designation unit 206 at step S501. The pattern image designated is the image that represents the lead frame of a scene (e.g., the title screen of a specific part of a TV program). One conceivable method of designating the pattern image is for the user to create an image that resembles the lead frame of the scene. Next, at step S502, the scene extraction unit 207 regards the pattern image, which has been designated by the pattern image designation unit 206, as being a frame, and uses the interframe-similarity calculation unit 204 to calculate the degree of similarity between this frame and the already detected scene-change frame. Though the method of calculating similarity is not particularly limited, one conceivable method is that mentioned in the scene-change detection processing described above The scene extraction unit 207 extracts the scene-change frame from the frame storage unit 209 upon referring to the ID of the moving picture and the starting frame of the scene-change information in the scene-change information storage unit 205.

Next, at step S503, the scene extraction unit 207 determines whether the pattern image is a frame identical with the scene-change frame based upon the degree of similarity calculated by the interframe-similarity calculation unit 204. If the frames are not identical ("NO" at step S503), control proceeds to step S505. If the frames are identical ("YES" at step S503), on the other hand, then, at step S504, the ID of the moving picture is output to the extracted-scene list display unit 208 as well as the scene-change frame, which serves as the starting frame of a scene, and the frame (which will serve as the end frame of the scene) that immediately precedes the next scene-change frame. An example of a list of the extracted scenes is shown in FIG. 7.

Next, at step S505, it is determined whether all scene-change frames have been compared with the pattern image. If all scene-change frames have not been compared with the pattern image ("NO" at step S505), steps S502 to S504 are repeated to extract scenes that begin with those frames of all scene-change frames that are identical with the pattern image. If all scene-change frames have been compared with the pattern image ("YES" at step S505), then control proceeds to step S506. This is followed by step S506, at which the extracted-scene list display unit 208 causes the list of extracted scenes (FIG. 7) to be displayed for the user.

This concludes scene extraction processing.

Thus, in accordance with this embodiment, as described above, scene changes in an input moving picture can be detected automatically and the user, merely by designating a pattern image, can automatically extract a frame of a scene, which corresponds to the pattern image. As a result, the user need not perform such operations as detection of scenes and creation of a time-code list, thus making it possible to perform operations such as editing in an efficient manner.

OTHER EMBODIMENTS

In the embodiment described above, all frames are extracted and stored through steps S302 to S304, after which discrimination of a change in scene is performed at steps S305 to S308. However, it is permissible to adopt an arrangement in which discrimination of scene change is performed successively whenever a frame is extracted, and only the necessary frames (the scene-change frames, etc.) are stored in memory.

Further, though the list of extracted scenes (FIG. 7) per se is displayed for the user, it may be so arranged that the extracted scenes are edited into a single moving picture based upon the scene list and the scene list is displayed for the user. Alternatively, a printer may be connected to the apparatus to output the moving picture on a recording medium.

Further, a method in which the user creates the pattern image has been described as the method of designating the pattern image. However, it is permissible to adopt an arrangement in which scene-change frames extracted in scene-change detection are displayed for the user and the user selects a frame from these selected frames as the pattern image. It may also be so arranged that the selection is made from a group of other images that have been prepared in advance.

Further, though only one scene that starts from a frame resembling the pattern image is extracted in the foregoing embodiment, it may be so arranged that the user can designate the number of scenes, thereby making it possible to extract a designated number of scenes that start with a frame resembling the pattern image. It is permissible to designate a number of frames with regard to frames prior to and with regard to frames on and after a frame resembling the pattern image.

Further, though only one scene that starts from a frame resembling the pattern image is extracted in the foregoing embodiment, it may be so arranged that the user can designate scene length (time), thereby making it possible to (Reduce time from the number of frames of a scene based upon scene-change information and extract a scene of a designated length that begins with the frame resembling the pattern image. It is permissible to designate scene length (time) with regard to frames prior to and with regard to frames on and after a frame resembling the pattern image.

Only one scene that starts from a frame resembling the pattern image is extracted in the foregoing embodiment. However, if the frame immediately preceding a scene-change frame is extracted from the scene-change information and compared with the pattern image at step S502, then it will be possible to extract a scene that ends with a frame resembling the pattern image.

Again, only one scene that starts from a frame resembling the pattern image is extracted in the foregoing embodiment. However, if the pattern image is compared with all frames, a similar frame is found and a scene in which this frame is present is obtained by referring to the scene-change information, then it will be possible to extract a scene containing a frame resembling the pattern image.

As described above, this embodiment enables user to automatically extract a frame, which corresponds to the pattern image, that is the leading, intermediate or final frame of a scene. In addition, extracted scenes can be combined into a single moving picture automatically.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function extension unit performs a part of or the entire process in accordance with the designation of program codes and implements the function of the above embodiment.

In a case where the present invention is applied to the above-mentioned storage medium, program code corresponding to the flowcharts of FIGS. 3 and 6 described earlier would be stored on the storage medium.

Thus, in accordance with the embodiments of the present invention as described above, it is possible to provide an image processing apparatus, method and computer-readable memory through which a desired scene can be extracted from a plurality of moving-picture materials in an efficient manner.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing a moving picture having scene-change information, comprising:
   designating means for designating an image that corresponds to a start scene that is the object of a search and the number of scenes from the start scene included in a moving picture;
   comparison means for comparing a scene-change frame obtained by referring to the scene-change information with the image designated by said designation means;
   scene extraction means for extracting moving pictures, each of which has scenes of the number of scenes and includes a scene corresponding to the image designated by said designation means, based upon a result of the comparison performed by said comparison means; and
   output means for combining each of the moving pictures extracted by said scene extraction means into a single moving picture.

2. The apparatus according to claim 1, wherein said designating means is capable of designating the number of scenes to be extracted with regard to frames prior to and with regard to frames on and after a frame corresponding to the pattern image.

3. An image processing apparatus for processing a moving picture having scene-change information, comprising:
   designating means for designating an image that corresponds to a start scene that is the object of a search and time length from the start scene included in a moving picture;
   comparison means for comparing a scene-change frame obtained by referring to the scene-change information, with the image designated by said designation means;
   scene extraction means for extracting moving pictures each of which has scenes of the time length and includes a scene corresponding to the image designated by designation means based upon a result of the comparison performed by said comparison means; and
   output means for combining each of the moving pictures extracted by said scene extraction means into a single moving picture.

4. The apparatus according to claim 3, wherein said designating means is capable of designating the time of a scene to be extracted with regard to frames prior to and with regard to frames on and after a frame corresponding to the pattern image.

5. The apparatus according to claim 1 or claim 3, wherein said comparison means includes computation means for computing degree of similarity between the scene-change frame and the image that has been designated by said designation means, and
   wherein said scene extraction means extracts the scene corresponding to said image based upon results of computation performed by said computation means.

6. The apparatus according to claim 1 or claim 3, wherein said designating means designates a pattern image that corresponds to any of a leading, intermediate or final frame of a scene that is the object of a search.

7. An image processing method for processing a moving picture having scene-change information, comprising:
   a designating step, of designating an image that corresponds to a start scene that is the object of a search and the number of scenes from the start scene included in a moving picture;
   a comparison step, of comparing a scene-change frame, obtained by referring to the scene change information with the image designated in said designation step;
   a scene extraction step, of extracting moving pictures, each of which has scenes of the number of scenes designated in said designation step, based upon a result of the comparison performed in said comparison step; and
   an output step, of combining each of the moving pictures extracted in said scene extraction step into a single moving picture.

8. The method according to claim 7, wherein said designating step includes designating the number of scenes to be extracted with regard to frames prior to and with regard to frames on and after a frame corresponding to the pattern image.

9. An image processing method for processing a moving picture having scene-change information, comprising:
   a designating step, of designating an image that corresponds to a start scene that is the object of a search and time length from the start scene included in a moving picture;
   a comparison step, of comparing a scene-change frame, obtained by referring to the scene change information that has been stored in said storage step, with the image designated in said designation step;
   a scene extraction step, of extracting moving pictures, each of which has scenes of the time length and includes a scene corresponding to the image designated in said designation step, based upon a result of the comparison performed in said comparison step; and an output step, of combining each of the moving pictures extracted in said scene extraction step into a single moving picture.

10. The method according to claim 9, wherein said designating step includes designating the time of a scene to be extracted with regard to frames prior to and with regard to frames on and after a frame corresponding to the pattern image.

11. The method according to claim 7 or claim 9, wherein said comparison step includes a computation step, of computing degree of similarity between the scene-change frame and the image that has been designated in said designation step, and wherein said scene extraction step includes extracting the scene corresponding to the image based upon results of computation performed in said computation step.

12. The method according to claim 7 or claim 9, wherein said designating step includes designating a pattern image that corresponds to any of a leading, intermediate or final frame of a scene that is the object of a search.

13. A computer program encoded on a computer readable medium storing program code containing executable instructions, when executed in a processing system, causes the system to process a moving picture having a scene-change information, comprising:

program codes of a designating step, of designating an image that corresponds to a start scene that is the object of a search and the number of scenes from the start scene included in a moving picture;

program codes of a comparison step, of comparing a scene-change frame, which is obtained by referring to the scene change information with the image designated in said designation step;

program codes of a scene extraction step, of extracting moving pictures, each of which has scenes of the number of scenes designated in said designation step, based upon a result of the comparison performed in said comparison step; and program codes of an output step, of combining each of the moving pictures extracted in said scene extraction step into a single moving picture.

14. A computer-readable memory storing program code of image processing for processing a moving picture having screen-change information, the memory including:

program code of a designating step, of designating an image that corresponds to a start scene that is the object of a search and time length from the start scene included in a moving picture;

program code of a comparison step, of comparing a scene-change frame obtained by referring to the scene change information that has been stored in said storage step, with the image designated in said designation step;

program code of a scene extraction step, of extracting moving pictures, each of which has scenes of the time length and includes a scene corresponding to the image designated in said designation step, based upon a result of the comparison performed in said comparison step; and program code of an output step, of combining each of the moving pictures extracted in said scene extraction step into a single moving picture.

* * * * *

UNITED STATES PATENT AND TRADEMARK OFFICE
CERTIFICATE OF CORRECTION

| | | |
|---|---|---|
| PATENT NO. | : 7,170,935 B2 | |
| APPLICATION NO. | : 09/503476 | |
| DATED | : January 30, 2007 | |
| INVENTOR(S) | : Tojo | |

It is certified that error appears in the above-identified patent and that said Letters Patent is hereby corrected as shown below:

ON THE TITLE PAGE, ITEM (56):
U.S. Patent Documents, "Nagasaki et al." should read -- Nagasaka et al. --.

COLUMN 2:
Line 59, "derail" should read -- detail --.

COLUMN 3:
Line 33, "changes" should read -- change --.

COLUMN 4:
Line 19, "A" should read -- An --.

COLUMN 5:
Line 2, "had" should read -- made --; and
Line 21, "above" should read -- above. --.

COLUMN 6:
Line 33, "(Reduce" should read -- deduce --.

COLUMN 8:
Line 8, "pictures" should read -- pictures, --.

COLUMN 9:
Line 23, "computer readable" should read -- computer-readable --.

UNITED STATES PATENT AND TRADEMARK OFFICE
CERTIFICATE OF CORRECTION

PATENT NO. : 7,170,935 B2
APPLICATION NO. : 09/503476
DATED : January 30, 2007
INVENTOR(S) : Tojo It is certified that error appears in the above-identified patent and that said Letters Patent is hereby corrected as shown below:

COLUMN 10:
Line 11, "A computer-readable memory storing program code of image processing for processing a moving picture having screen-change information, the memory including:" should read
-- A computer program encoded on a computer-readable medium storing program code containing executable instructions, when executed in a processing system, causes the system to process a moving picture having a scene-change information, comprising: --.

Signed and Sealed this

Twenty-fifth Day of March, 2008

JON W. DUDAS
*Director of the United States Patent and Trademark Office*